United States Patent
Dilts et al.

(10) Patent No.: US 12,471,535 B2
(45) Date of Patent: Nov. 18, 2025

(54) RESIDUE CHOPPER WITH COUNTERBLADES AND FINS

(71) Applicant: CNH Industrial America LLC, New Holland, PA (US)

(72) Inventors: Mark D. Dilts, Mohnton, PA (US); Stefaan Desmet, Vosselare (BE); Frederik Baes, Reninge (BE); Nathan E. Isaac, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 1037 days.

(21) Appl. No.: 17/529,023

(22) Filed: Nov. 17, 2021

(65) Prior Publication Data

US 2023/0148476 A1    May 18, 2023

(51) Int. Cl.
*A01F 12/40* (2006.01)
*A01D 41/12* (2006.01)

(52) U.S. Cl.
CPC .......... *A01F 12/40* (2013.01); *A01D 41/1243* (2013.01)

(58) Field of Classification Search
CPC .............................. A01F 12/40; A01D 41/1243
See application file for complete search history.

(56) References Cited

U.S. PATENT DOCUMENTS

| 2,842,175 | A |   | 7/1958 | Thompson |
| 5,928,080 | A | * | 7/1999 | Jakobi ..................... A01F 12/40 56/505 |
| 7,553,225 | B2 |   | 6/2009 | Benes |
| 7,993,187 | B2 |   | 8/2011 | Ricketts et al. |
| 8,187,064 | B2 |   | 5/2012 | Schlesser et al. |

(Continued)

FOREIGN PATENT DOCUMENTS

| CN | 109566110 A | 4/2019 |
| EP | 0415419 A2 | 3/1991 |

(Continued)

OTHER PUBLICATIONS

International Search Report and Written Opinion of the International Searching Authority for Application No. PCT/US2022/049944 dated Feb. 14, 2023 (10 pages).

*Primary Examiner* — Joseph M Rocca
*Assistant Examiner* — Ashley A Kaercher
(74) *Attorney, Agent, or Firm* — Buchanan Ingersoll & Rooney PC

(57) ABSTRACT

A residue chopper comprising a housing forming a cutting chamber, a shaft, knives extending from the shaft, a counterknife support, a counterknife, and a fin. The counterknife and fin are attached to the counterknife support, with the fin behind the counterknife. the fin has a blunt side facing against the operating direction. The counterknife support is movable between a first position in which the counterknife extends a minimum predetermined distance into the cutting chamber and the fin is not within the cutting chamber, a second position in which the counterknife extends an intermediate predetermined distance into the cutting chamber and within the cutting volume and the fin is not within the cutting chamber, and a third position in which the counterknife extends a maximum predetermined distance into the cutting chamber and into the cutting volume and the fin extends into the cutting chamber.

19 Claims, 6 Drawing Sheets

(56) References Cited

U.S. PATENT DOCUMENTS

| | | | |
|---|---|---|---|
| 9,227,193 B2 | 1/2016 | Dilts et al. | |
| 10,201,128 B2* | 2/2019 | Weichholdt | A01D 41/00 |
| 10,588,261 B2 | 3/2020 | Dilts et al. | |
| 10,820,519 B2 | 11/2020 | Linde et al. | |
| 11,612,107 B2* | 3/2023 | Duquesne | A01F 12/40 |
| | | | 460/112 |
| 2002/0119809 A1 | 8/2002 | Bognar et al. | |
| 2015/0038201 A1* | 2/2015 | Brinkmann | A01F 12/40 |
| | | | 460/112 |
| 2016/0007537 A1 | 1/2016 | Dilts et al. | |
| 2017/0055445 A1* | 3/2017 | Mahieu | A01F 12/40 |
| 2017/0099771 A1* | 4/2017 | Linde | A01F 29/095 |

FOREIGN PATENT DOCUMENTS

| | | | | |
|---|---|---|---|---|
| EP | 2837280 A1 | 2/2015 | | |
| FR | 1212595 A | 3/1960 | | |
| FR | 2727824 A1 | 6/1996 | | |
| WO | WO-2016105457 A2 * | 6/2016 | | A01D 41/1243 |

\* cited by examiner

RESIDUE CHOPPER WITH COUNTERBLADES AND FINS

BACKGROUND OF THE INVENTION

Agricultural machines, such as combine harvesters, typically process crop material, and deposit a portion of the material on the ground behind the machine. As the purpose of the harvester is to collect grain, the material that is deposited is primarily material other than grain ("MoG"), such as chaff and stalks. This is commonly called "residue." It is generally desirable to minimize the size of the residue pieces, and to spread the residue evenly across the path of the machine. For this purpose, the machine may include a chopper to reduce the residue size, and a spreader to distribute the residue.

The chopper typically comprises a series of knives that rotate about a shaft and are partially enclosed by a shroud. The residue enters the shroud, and the knives strike and cut the residue. The effectiveness of the chopper (i.e., efficiency, processing flow rate, residue size reduction, etc.) can be influenced by external factors, such as the type of crop and crop conditions, and inherent factors, such as knife sharpness, number of knives, rotating speed, and dimensions of the parts.

Efforts to modify choppers to reduce the residue particle size typically focus on increasing the cutting action, or creating more opportunities for the knives to impact and cut the residue particles. The cutting action can be increased by sharpening the knives, altering the number of knives, and so on, or by adding counterknives that extend radially towards the shaft, and between adjacent pairs of the rotating knives, to provide additional cutting edges. Increasing the cutting opportunities can be achieved by adding a shredbar, which is an elongated plate or bar that extends in parallel with the chopper shaft rotation axis just outside the reach of the knives. The shredbar acts slows the residue movement and gives the moving knives more opportunities to cut the residue. Counterknives and shredbars may be fixed in place, or movable at the control of the operator or operating system to address varying crops and crop conditions.

While the foregoing devices provide some level of effectiveness, it has been determined that improved residue comminution can still be desirable.

This description of the background is provided to assist with an understanding of the following explanations of exemplary embodiments, and is not an admission that any or all of this background information is necessarily prior art.

SUMMARY OF THE INVENTION

In one exemplary aspect, there is provided a residue chopper comprising: a housing defining a partially enclosed cutting chamber; a shaft rotatably mounted within the cutting chamber and configured to rotate in an operating direction about a rotation axis extending along a longitudinal direction; a plurality of knives extending from the shaft at respective axial locations along the longitudinal direction, each of the plurality of knives extending from a respective proximal end at the shaft to a respective distal end at a radial distance from the shaft, the radial distance defining a cutting volume; a counterknife mounted to the counterknife support to move directly with the counterknife support; and a fin rigidly mounted to the counterknife support to move directly with the counterknife support, the fin being mounted behind the counterknife relative to the operating direction and having a blunt side facing against the operating direction. The counterknife support is movable between a first position in which the counterknife extends a minimum predetermined distance into the cutting chamber and the fin is not within the cutting chamber, a second position in which the counterknife extends an intermediate predetermined distance into the cutting chamber and within the cutting volume and the fin is not within the cutting chamber, and a third position in which the counterknife extends a maximum predetermined distance into the cutting chamber and into the cutting volume and the fin extends into the cutting chamber.

In another exemplary aspect, there is provided an agricultural combine comprising: a chassis configured for movement on a surface; a threshing and separating system attached to the chassis; and a residue chopper as described according to the foregoing aspect.

BRIEF DESCRIPTION OF THE DRAWINGS

Embodiments of inventions will now be described, strictly by way of example, with reference to the accompanying drawings, in which.

In the figures, like reference numerals refer to the same or similar elements.

DETAILED DESCRIPTION OF THE DRAWINGS

Exemplary embodiments of the present invention provide choppers which may be used in agricultural equipment (e.g., combines, windrowers, etc.), or in other environments. However, the invention is not limited to any particular application except as may be specifically recited in the claims.

Figure 1:
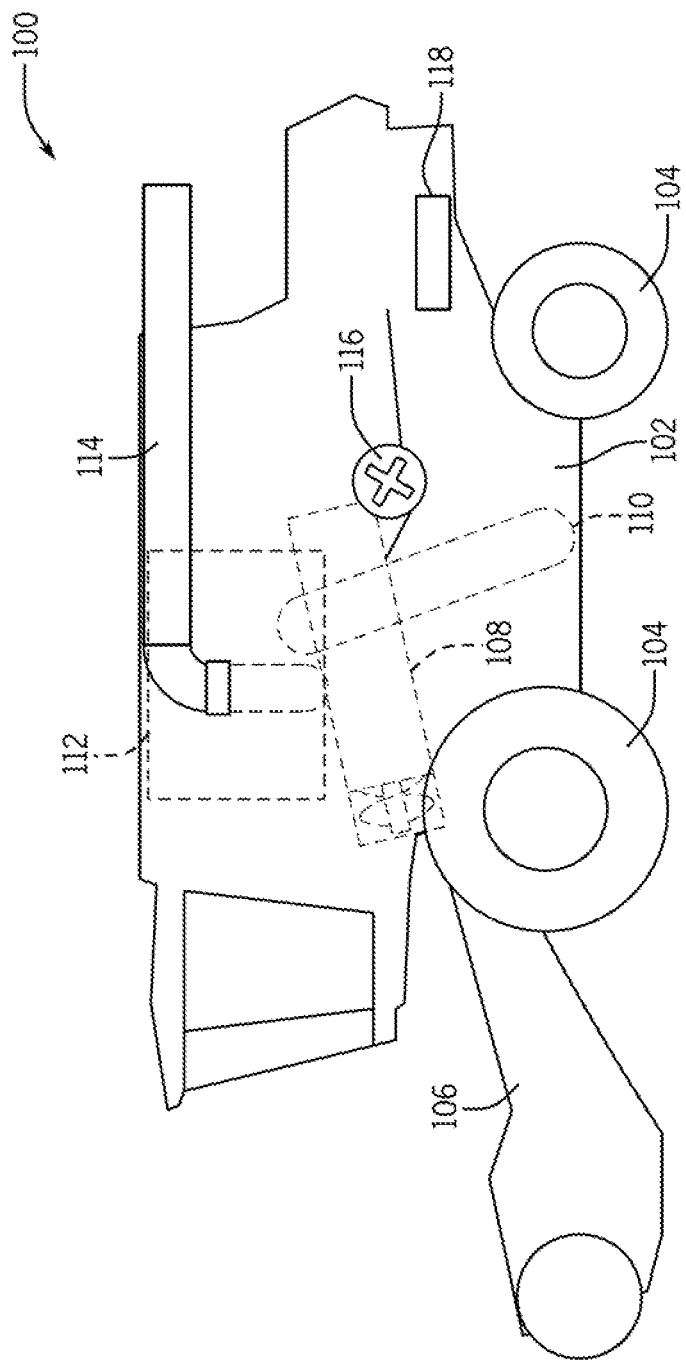
FIG. 1 schematically illustrates a side view of an example of an agricultural combine having a residue chopper such as described herein.

Referring to FIG. 1, an example of an agricultural combine 100 is schematically illustrated. The combine 100 includes a chassis 102 that is supported for movement on the ground by wheels 104 (e.g., pneumatic tires or tracked wheels). A header assembly 106 is attached to the combine 100 and configured to receive crop material and convey such material to a threshing and separating system 108 located in or on the chassis 102. The threshing and separating system 108 separates grain from the remaining crop material (also known as "material other than grain," "MoG," or "residue") and an auger 110 or the like conveys the grain to a grain hopper 112. The threshing and separating system may comprise an axial flow thresher, twin axial flow thresher, cross-flow thresher, and so on. An unloader boom 114 may be provided to remove the separated grain as the combine 100 operates.

The residue exits the threshing and separating system 108 and falls into, or is otherwise conveyed to, a crop residue chopper 116, such as those described herein. The residue chopper 116 comminutes the residue, and the residue is then delivered to a spreader 118. The spreader comprises rotating disks or the like, which distribute the comminuted residue across the path of the combine 100.

The features described in relation to FIG. 1 are generally conventional, except for the residue chopper 116, and no further explanations of their structures or operations are necessary.

Figure 2:
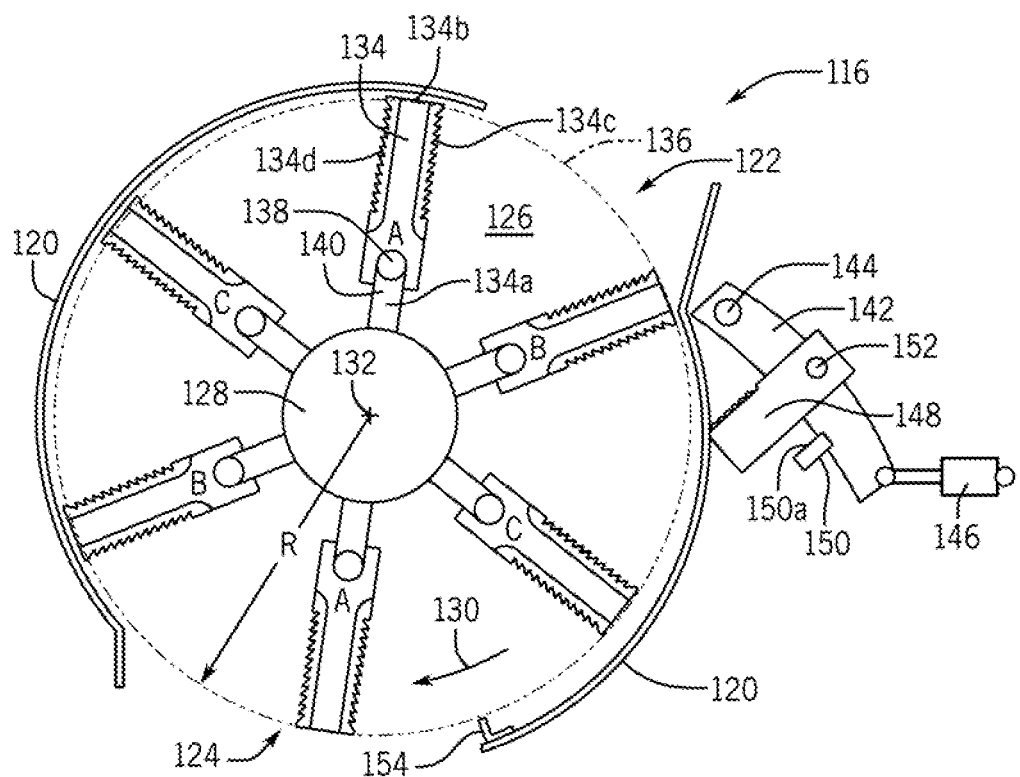
FIG. 2 is a side view of an exemplary residue chopper.
Figure 3:
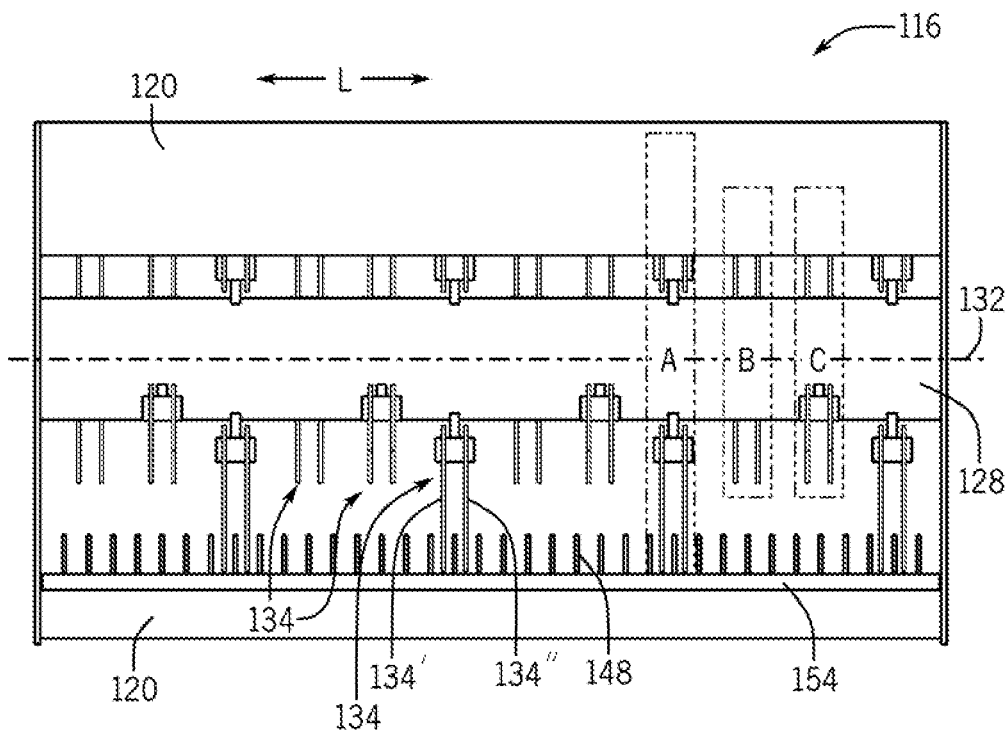
FIG. 3 is a rear view of the residue chopper of FIG. 2.

Referring now to FIGS. 2 and 3, an example of a chopper 116 is illustrated and described in more detail. The chopper 116 includes a housing 120 having a housing inlet 122 and a housing outlet 124, and defines a partially enclosed cutting chamber 126. The housing 120 may be formed of sheet metal or the like, and may be assembled into a structure that installs within the combine 100, preferably such that the chopper 116 is a replaceable unit. A shaft 128 is rotatably mounted within the cutting chamber 126, and configured to rotate in an operating direction 130 about a rotation axis 132. Any suitable drive mechanism may be provided to rotate the shaft 128. For example, the shaft 128 may be driven by a hydraulic motor, an electric motor, or via a power takeoff from an internal combustion engine.

Knives 134 extend from the shaft 128 at respective axial locations along the rotation axis 132. Each knife 134 extends generally radially from a respective proximal end 134*a* to a respective distal end 134*b*. The proximal end 134*a* is fixed to the shaft 128, and the distal end 134*b* is located at a radial distance R from the shaft. The radial distance R defines a cutting volume 136. The cutting volume 136 extends in the longitudinal direction L (i.e., parallel to the rotation axis 132) as a cylindrical shape along the axial length of the shaft 128, or at least the portion of the shaft 128 spanning the knives 134. It will be appreciated that the knives 134 do not literally occupy the entire cutting volume 136, but instead form a general region including the space in the longitudinal direction L between adjacent knives 134.

The knives 134 are configured to cut crop residue. For example, the leading edge 134*c* of each knife 134 (i.e., the edge facing in the operating direction 130) may be sharpened, or include serrations, such as shown. The trailing edges 134*d* also may be sharpened or include serrations, as also shown, which allows the knives 134 to be turned around during service to extend their service life prior to replacement or sharpening.

Referring more specifically to FIG. 3, each knife 134 may be configured as two separate identical or similar blades 134', 134" that are fixed together by a pin 138 or bolt. The pin 138 may be connected to a post 140 that joins the two blades 134', 134" to the shaft 128. The pin 138 may allow the blades 134', 134" to freely pivot (or be rotationally adjusted) relative to the post 140 about an axis that is parallel the rotation axis 132, but this is not required.

The knives 134 may be arranged in knife pairs, such as the pairs designated as A, B and C in FIGS. 2 and 3. Each knife pair A, B, C has two knives 134 (and each knife 134 comprises two blades 134', 134") that extend from the shaft in opposite directions (i.e., the knives 143 are oriented at 180° relative to each other about the rotation axis 132). The knives 134 of each pair A, B, C are also joined to the shaft 128 at a common location along the rotation axis 132. Each knife pair A, B, C is indexed about the rotation axis 132 relative to the adjacent knife pair A, B, C. For example, knife pair B is rotated relative to knife pair A by an angle of 20° to 70°, and knife pair C is rotated relative to knife pair B by an angle of 20° to 70°. In the shown exemplary embodiment, the each knife pair A, B, C is indexed 60° relative to each adjacent knife pair A, B, C, resulting in even angular spacing. Thus, the knives 134 are staggered relative to the rotation axis 132.

The spacing along the longitudinal direction L between each knife pair A, B, C, may be equal, but this is not required. It will also be appreciated that other embodiments may have a single knife 134 at each location in the longitudinal direction L, or more than two knives 134 at each location. For example, one or more of the knife pairs may be replaced by sets of three knives 134 that are oriented at 120° relative to each other about rotation axis 132, or sets of four knives 134 that are oriented at 90° relative to each other about the rotation axis 132. The knives in any particular pair or group also may be oriented at uneven angles about the rotation axis 132. For example, four knives 134 may be provided with the angular spacing between each knife 134 being 120°, 60°, 120° and 60°, in that order, around the circumference of the shaft 128. Other alternatives and variations will be apparent to persons of ordinary skill in the art in view of the present disclosure.

Referring back to FIG. 2, the residue chopper 116 also includes a counterknife support 142, which is movably mounted relative to the housing 120, and outside the cutting chamber 126. The counterknife support 142 in this case is rotatably mounted to the housing 120 by a pivot 144, but in other embodiments, the counterknife support 142 may be mounted to the housing 120 by a parallel linkage, a slider, and so on.

An actuator 146 is attached to the counterknife support 142, and configured to move the counterknife 142 through a predetermined range of motion, as described below. The actuator 146 may be a hydraulic or pneumatic telescoping piston and cylinder assembly, a rotating or sliding cam, an electric motor, and so on. The actuator 146 may be manually operated, or operated by a control system.

A counterknife 148 and a fin 150 are mounted to the counterknife support 142, preferably (but not necessarily) with the counterknife 148 between the fin 150 and the pivot 144. The pivot 144 also preferably is located in front of the counterknife 148 and fin 150 relative to the operating direction 130. The counterknife 148 may be rigidly attached to the counterknife support 142, or mounted in a manner to allow some relative movement therebetween. For example, the counterknife 148 may be mounted to the counterknife support 142 by a pivot 152 and spring (not shown) that allows the counterknife 148 to rotate through a small range to help absorb large impact loads. The fin 150 preferably is rigidly mounted to the counterknife support 142, such that is not adjustable relative to the counterknife support 142. This provides a durable structure, and removes uncertainty of the system's performance during operation with various different compositions of grain material loading. This also avoids the option of making potentially-detrimental adjustments of the fin 150 position.

Figure 4A:
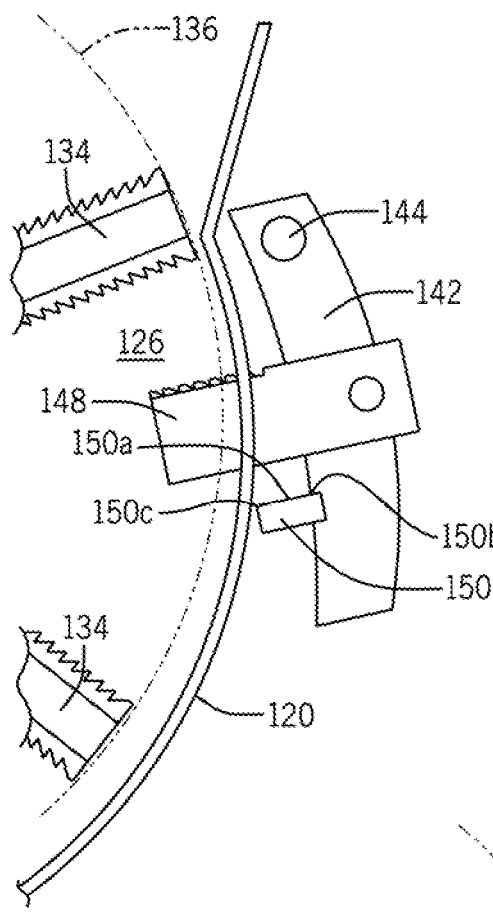
FIGS. 4A and 4B are detail side views of the residue chopper of FIG. 2 shown in alternative operating positions.
Figure 4B:
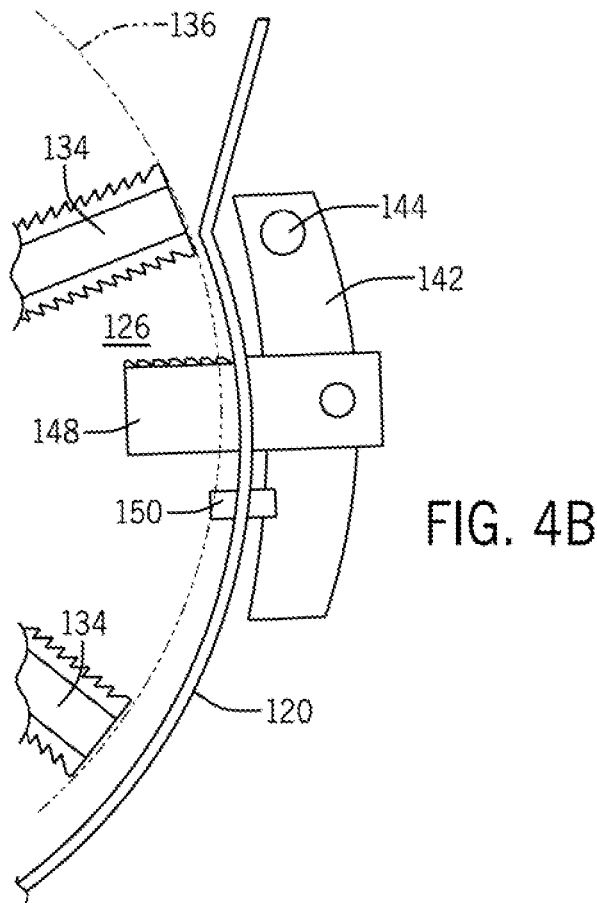

The fin 150 and counterknife 148 also may be connected to move directly with the counterknife support 142. For example, as shown in FIGS. 4A and 4B, there is a one-to-one relationship between motion of the counterknife support 142 and motion of each of the counterknife 148 and fin 150. In this arrangement, there is no slack, such as would be provided by a lost-motion linkage (e.g., a slotted connection), between either the fin 150 or the counterknife 148 and the counterknife support 142. This direct connection can include some capability for fully-regulated relative movement. For example, as explained above, the counterknife 148 might be mounted to the counterknife support 142 by a pivot 152 that allows limited pivotal movement about the pivot 152, but the counterknife 148 will always move directly with the counterknife support 142 via their mutual connection at the pivot 152.

The counterknife 148 may comprise a serrated, straight or curved sharpened edge facing against the operating direction 130, to thereby present a sharp edge towards the incoming crop residue and enhance the overall cutting action of the chopper 116. The counterknife 148 also may be reversible during service to present a fresh sharpened edge against the operating direction, or to present a different type of edge to the operating direction. For example, the shown counterknife 148 has a serrated edge on one side, and a straight edge on the opposite side, allowing interchangeability to obtain different performance characteristics.

The fin 150 is mounted to the counterknife support 142 behind the counterknife 148 relative to the operating direction 130, such that the knives 134 pass the counterknife 148 before passing the fin 150. The fin 150 preferably has a blunt side 150a facing against the operating direction 130, as explained in more detail below.

The chopper 116 also may include other features. For example, a shredbar 154 may be mounted to the housing 120 at a location downstream of the counterknife 148 and fin 150. In contrast to the pin 150, which does not span multiple blades 134 along the longitudinal direction L, the shredbar 154 comprises a continuous bar or plate that extends into the cutting chamber 126 from the housing 120, but does not intersect the cutting volume 136. As is conventional, shredbar 154 extends continuously to span multiple knives 134 along the longitudinal direction L. In a preferred embodiment, the shredbar 154 extends the full distance of the cutting chamber 126 in the longitudinal direction L. The shredbar 154 acts as a dam to hold residue adjacent to the cutting volume 136, to thereby enhance chopping (e.g., by providing a surface against which residue can be sheared by the knives 134). The shredbar 154 may be fixed or movable through a range of travel, and may be straight or include serrations or the like. Other alternatives and variations will be apparent to persons of ordinary skill in the art in view of the present disclosure.

Referring now to FIGS. 2, 4A and 4B, the counterknife support 142 is movable between various operating positions. In a first position, shown in FIG. 2, the counterknife support 142 is moved to retract the counterknife 148 and fin 150 as far as possible (at least during normal operation) from the cutting chamber 126. This is the fully-retracted operating position (in service, it may be possible to further retract the counterknife support 142 upon detaching an actuator 146 or other control linkages or mechanisms). In the first position, the counterknife 148 extends a minimum predetermined distance into the cutting chamber 126 and the fin 150 is not within the cutting chamber 126. The minimum predetermined distance may be zero or less than zero (i.e., the counterknife 148 is not within the cutting chamber 126 at all), or a relatively small distance into the cutting chamber 126. In this position, the counterknife 148 may be within the cutting volume 136 a minimum distance, or completely outside the cutting volume 136. The first position may be a position selected such that the counterknife 148 does not materially contribute to the chopping operation.

In a second position, shown in FIG. 4A, the counterknife 148 extends an intermediate predetermined distance into the cutting chamber 126 and within the cutting volume 136, and the fin 150 still is not within the cutting chamber 126. The intermediate predetermined distance is greater than the minimum predetermined distance. In this position, the counterknife 148 contributes to comminuting the residue by, for example, acting as a cutting edge to sever residue or acting as a flow impediment that helps hold the residue to improve cutting by the knives 134. It will be appreciated that the counterknife support 142 could be placed in a continuous range of different positions in which the counterknife 148 is within the cutting volume 136 and the fin 150 is not within the cutting chamber 126, and all such positions would be considered a second position (as compared to the first position and third position as described herein).

In a third position, shown in FIG. 4B, the counterknife 148 extends a maximum predetermined distance into the cutting chamber 126 and into the cutting volume 136, and the fin 150 also extends into the cutting chamber, and optionally into the cutting volume 136. The maximum predetermined distance is greater than the intermediate predetermined distance, and this represents the fully-extended operating position of the counterknife support 142. In this position, the counterknife 148 contributes to comminuting the residue as noted above, and the fin 150 further contributes to comminuting the residue by acting as an impediment to hold the residue as it is chopped by the knives 134.

The relative dimensions of the parts can be selected based on expected operating conditions and empirical testing. For example, it is expected that a fin 150 having an effective length of about 5% to about 50% of the effective length of the counterknife 148 will be useful. (As used herein, the "effective length" is the respective distance by which each of the counterknife 148 and fin 150 protrude into the cutting chamber 126, as measured radially relative to the rotation axis 132, when the counterknife support 132 is in the third position.) It is also expected that a fin 150 having an effective length of about 15% to about 20% of the effective length of the counterknife 148 will provide a suitable configuration for many conditions. In this case, as the counterknives 148 approach about 80% to about 85% insertion, the fins 150 begin to enter the cutting chamber 126, and when the counterknives reach the final (i.e., third) position, the fins 150 are fully projected into the cutting chamber 126. Other alternatives and variations will be apparent to persons of ordinary skill in the art in view of the present disclosure.

It is expected that the foregoing embodiment will provide advantages over devices having other arrangements of the parts. For example, locating the counterknife 148 between the fin 150 and the pivot 144 provides a large range of adjustment for the counterknife 148, while having the fin 150 enter the cutting chamber 126 only near the end of the counterknife's 148 travel. Another advantage is that placing the counterknife 148 and fin 150 downstream of the pivot 144 results in the torque loading on the counterknife support 142, which is generated by contact between the moving residue and the counterknife 148 and fin 150, being generally applied in a single direction about the pivot 144—namely, to drive the counterknife support 142 away from the cutting chamber 126. This provides predictable operating torque characteristics, which facilitates design of a durable system. In contrast, locating the pivot 144 downstream of the counterknife 148 and fin 150 will lead to operating torques that push the assembly into the cutting chamber 126, and could also lead to situations in which the operating torque about the pivot 144 changes in direction depending on the operating conditions, thus complicating the design of the system.

Figure 5:
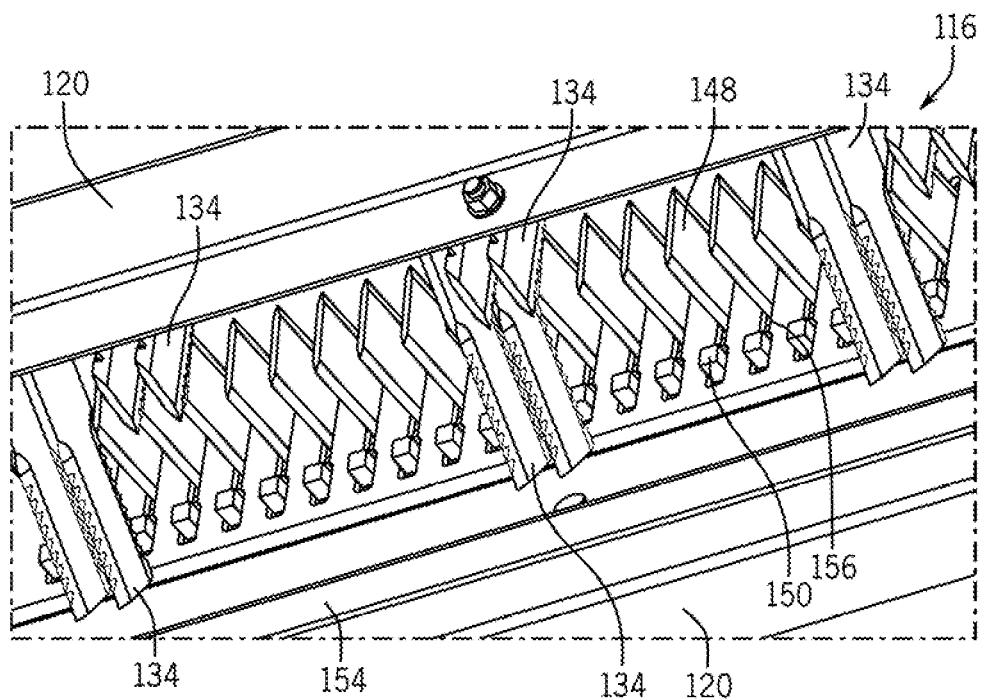
FIG. 5 is an isometric view of a portion of the residue chopper of FIG. 2.

FIG. 5 illustrates a chopper 116, such as the embodiment of FIGS. 3-4B, in the third position. In this case, the chopper includes a plurality of counterknives 148 and a plurality of fins 150. The counterknives 148 are distributed along the longitudinal direction L, and a respective fin 150 is spaced behind each respective counterknife 148 relative to the operating direction 130. In this case, each fin 150 is located at the same position along the longitudinal direction L as the respective counterknife 148 (i.e., the fin 150 and the counterknife 148 are in a common plane that is orthogonal to the rotation axis 132). The fins 150 may extend into the cutting volume 136 while in the third position, but this is not required.

The counterknives 148 and fins 150 may be operated individually, in groups, or all in unison. For example, each counterknife 148 and fin 150 may be attached to an individually movable counterknife support 142, or all of the counterknives 148 and fins 150 may be mounted to a single counterknife support 142 that extends along the longitudinal direction. As another example, each counterknife 148 and fin 150 may be connected to an individual counterknife support 142, but two or more counterknife supports 142 may be connected to move with each other. Other alternatives and variations will be apparent to persons of ordinary skill in the art in view of the present disclosure.

As will be apparent from the view of FIGS. 2, 4A, 4B and 5, the blunt side 150*a* of the fin 150 in this example comprises a simple flat surface that faces against the operating direction 130. The blunt side 150*a* may, for example, be a flat rectangular or square surface that extends approximately radially to the rotation axis 132 when in the third position. As shown in FIG. 4A, the blunt side 150*a* extends from a proximal fin end 150*b* adjacent to the counterknife support 142, to a distal fin end 150*c* that is spaced from the counterknife support 142. One linear edge of the blunt side 150*a* lies along the distal fin end 150*c*. In other examples, the blunt side 150*a* may converge to a point at the distal fin end 150*c*, or may divide to multiple points at the distal fin end 150*c*. The blunt side 150*a* also may have a rounded or non-linear shape around its perimeter.

In still other cases, the blunt side 150*a* may not be flat, or may only be partially flat. For example, the fin 150 may comprise a cylinder that extends from the proximal fin end 150*b* to the distal fin end 150*c*. In this case, the blunt side 150*a* comprises a hemi-cylindrical surface facing in against the operating direction 130. Other alternatives and variations will be apparent to persons of ordinary skill in the art in view of the present disclosure.

Figure 6:
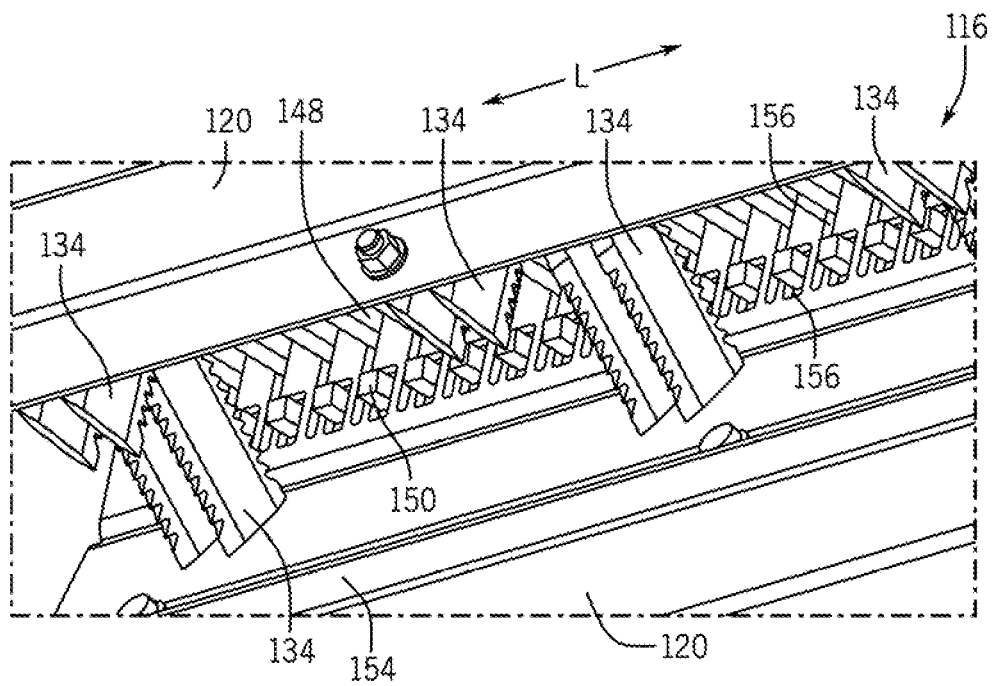
FIG. 6 is an isometric view of another exemplary residue chopper.

FIG. 6 shows an alternative embodiment, in which each fin 150 is behind a respective counterknife 148 with respect to the operating direction 130, but offset along the longitudinal direction L relative to the respective counterknife 148. In this case, the fins 150 may be positioned at the same longitudinal position as a knife 134 located adjacent to the counterknife 148 (i.e., in a common plane orthogonal to the rotation axis 132 with a knife 134), such that the fins 150 should not be permitted to enter the cutting volume 136 in the third position, to ensure that the knives 134 do not contact the fins 150. In other embodiments, the fins 150 may be offset along the longitudinal direction L relative to the associated counterknife 148, but not in the same plane as any of the knives 134, in which case the fin 150 can optionally enter the cutting volume 136 without being struck by the blades 134.

In FIGS. 5 and 6, it will be seen that the in counterknives 148 and fins 150 may pass through one or more slots 156 through the housing 120. The slots 156 preferably are shaped and dimensioned to limit intrusion of residue, and may include features such as movable covers or closable membranes to reduce residue loss.

Figure 7A:
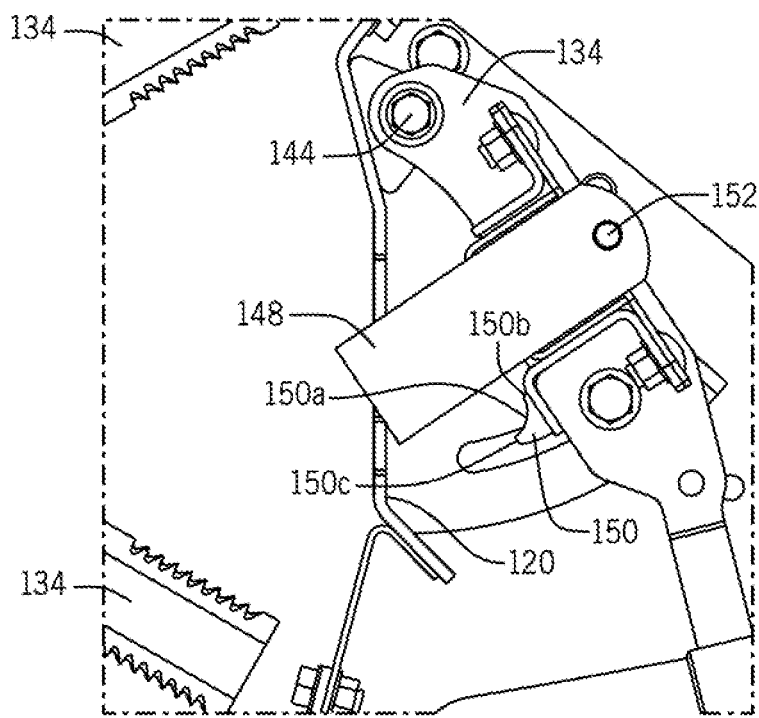
FIGS. 7A and 7B are side views of another exemplary residue chopper.
Figure 7B:
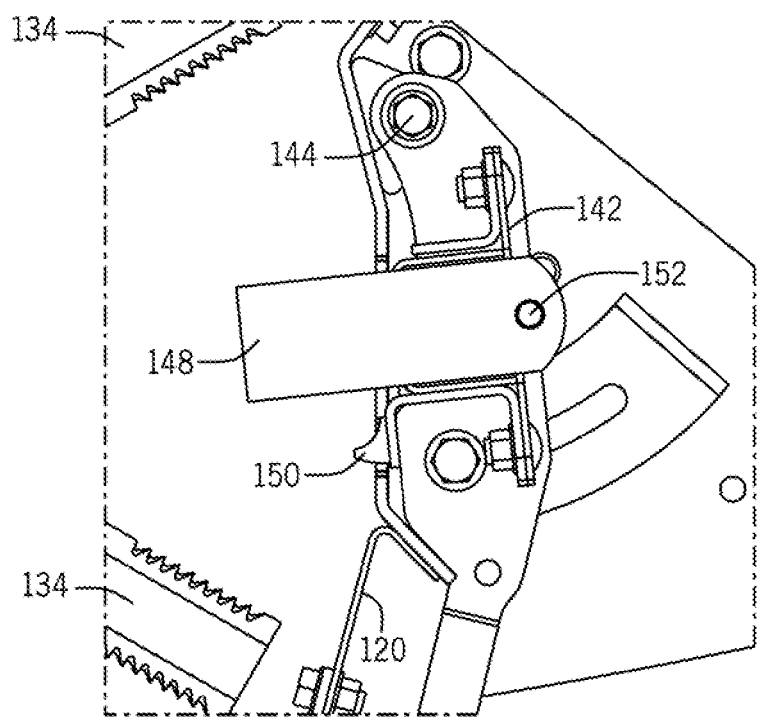
Figure 8:
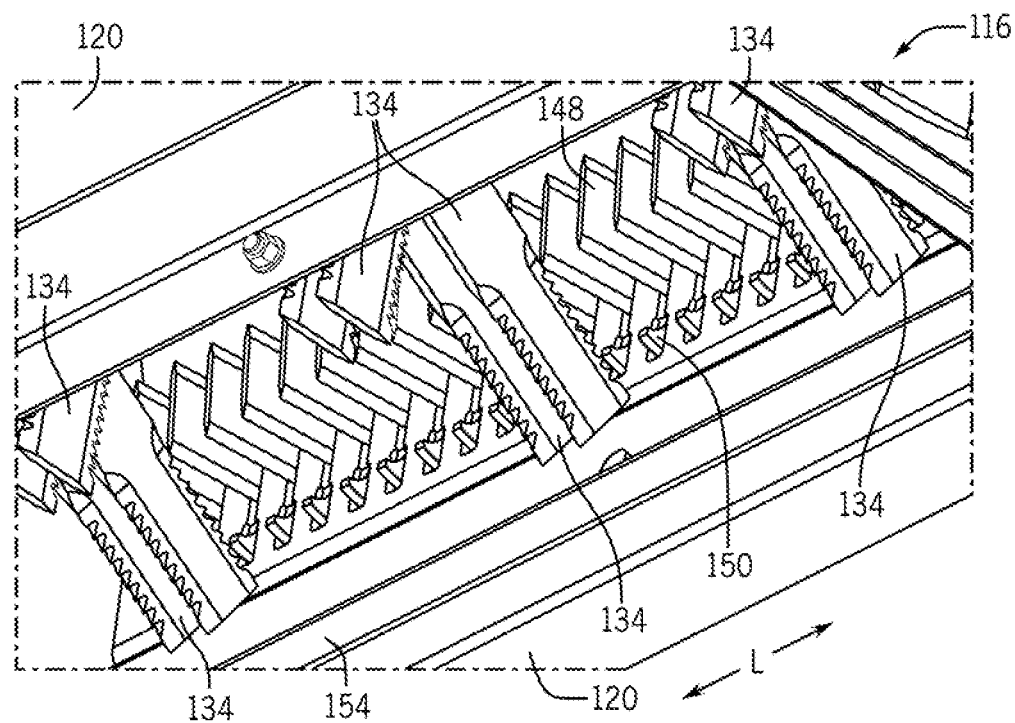
FIG. 8 is an isometric view of a portion of the residue chopper of FIGS. 7A and 7B.

FIGS. 7A, 7B and 8 illustrate an alternative embodiment, in which the fin 150 comprises a blunt side 150*a* in the form of a ramped surface facing against the operating direction. The ramped blunt side 150*a* extends from the proximal fin end 150*b* to the distal fin end 150*c*, and the ramped surface at the distal fin end 150*c* is behind the ramped surface at the proximal fin end 150*b* relative to the operating direction 130. Thus, the ramped blunt side 150*a* tends to guide residue away from the housing 120 and towards the cutting volume 136. The ramped blunt side 150*a* may extend linearly from the proximal fin end 150*b* to the distal fin end 150*c*, or it may comprise a concave surface facing against the operating direction 130 (such as shown), or a convex shape facing against the operating direction 130. Other shapes are also possible. It is expected that the shown concave shape will be effective at redirecting residue and also slowing residue movement along the operating direction 130, thus improving chopping performance.

Figure 9:
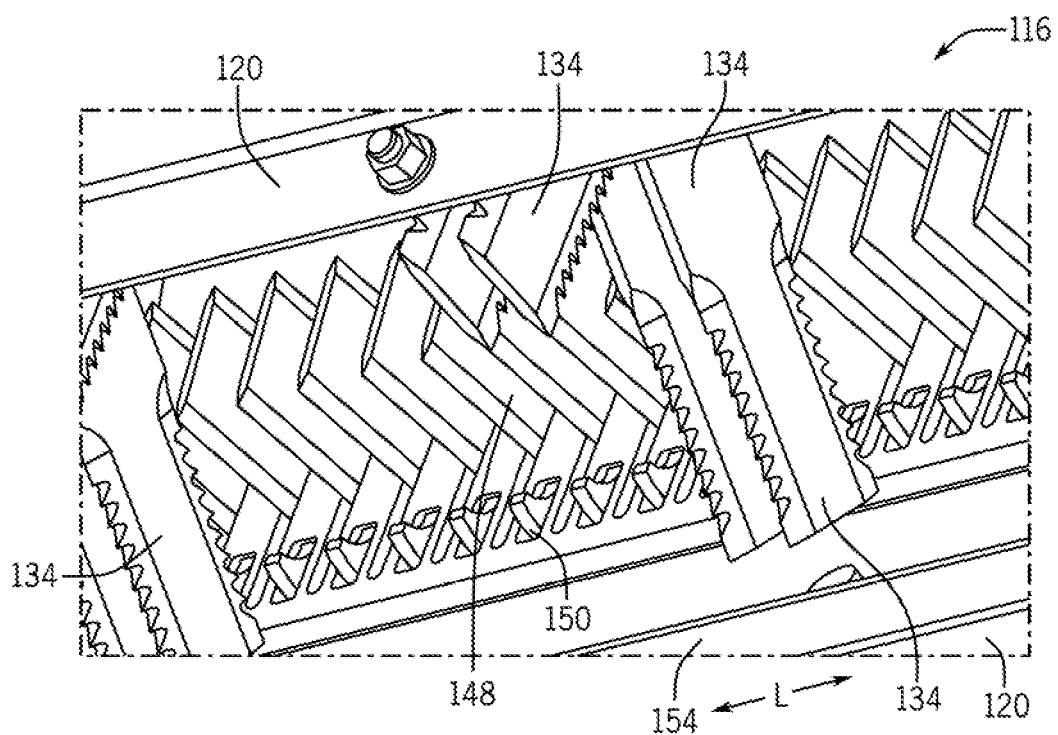
FIG. 9 is an isometric view of another exemplary residue chopper.

FIG. 9 shows a variation of the embodiment of FIGS. 7A, 7B and 8, in which each fin 150 is behind a respective counterknife 148 with respect to the operating direction 130, but offset along the longitudinal axis L relative to the respective counterknife 148 (similar to the embodiment of FIG. 6).

Embodiments such as those described above are expected to provide improved chopper performance for a variety of crop and operating conditions. The movable counterknife allows basic adjustment, while the fin can be brought into operation when it is desired to add a crop flow impediment to achieve a "shredbar" effect allowing more cuts by the knives. When fully inserted, the fin can also act as a shear surface to hold the crop residue closely to the cutting volume to cause more aggressive contact with the knife, and a ramped fin surface can help redirect the crop material into the knife path. It is also expected that the use of discrete fins will generate less drag than a conventional straight or toothed shredbar, thus requiring less operating power and increasing efficiency.

The present disclosure describes a number of inventive features and/or combinations of features that may be used alone or in combination with each other or in combination with other technologies. The embodiments described herein are all exemplary, and are not intended to limit the scope of the claims. It will be appreciated that various aspects of the embodiments described herein may be provided as component parts or as subassemblies. It will also be appreciated that the inventions described herein can be modified and adapted in various ways, and all such modifications and adaptations are intended to be included in the scope of this disclosure and the appended claims.

The invention claimed is:

1. A residue chopper comprising:
   a housing defining a partially enclosed cutting chamber;
   a shaft rotatably mounted within the cutting chamber and configured to rotate in an operating direction about a rotation axis extending along a longitudinal direction;
   a plurality of knives extending from the shaft at respective axial locations along the longitudinal direction, each of the plurality of knives extending from a respective proximal end at the shaft to a respective distal end at a radial distance from the shaft, the radial distance defining a cutting volume;
   a counterknife support rotatably mounted relative to the housing at a pivot that is located outside the cutting chamber;
   a counterknife mounted to the counterknife support to move directly with the counterknife support; and a fin rigidly mounted to the counterknife support to move directly with the counterknife support, the fin being mounted behind the counterknife relative to the operating direction and having a blunt side facing against the operating direction;

wherein the counterknife is mounted to the counterknife support at a location between the fin and the pivot, wherein the counterknife support is movable between a first position in which the counterknife extends a minimum predetermined distance into the cutting chamber and the fin is not within the cutting chamber, a second position in which the counterknife extends an intermediate predetermined distance into the cutting chamber and within the cutting volume and the fin is not within the cutting chamber, and a third position in which the counterknife extends a maximum predetermined distance into the cutting chamber and into the cutting volume and the fin extends into the cutting chamber.

2. The residue chopper according to claim 1, wherein at least one of the plurality of knives has a serrated edge facing in the operating direction.

3. The residue chopper according to claim 1, wherein at least one of the plurality of knives comprises two adjacent blades that are fixed together.

4. The residue chopper according to claim 1, wherein the plurality of knives are arranged in knife pairs, each knife pair comprising two knives extending from the shaft at a common location along the longitudinal direction, and oriented at 180° from each other about the rotation axis.

5. The residue chopper according to claim 4, wherein a first knife pair is located at a first location along the longitudinal direction, and a second knife pair is located at a second location along the longitudinal direction, and the second knife pair is indexed about the rotation axis relative to the first knife pair by an angle of 20° to 70°.

6. The residue chopper according to claim 4, wherein a first knife pair is located at a first location along the longitudinal direction, a second knife pair is located at a second location along the longitudinal direction, and a third knife pair is located at a third location along the longitudinal direction, and the second knife pair is indexed about the rotation axis relative to the first knife pair by an angle of 60° in the operating direction, and the third knife pair is indexed about the rotation axis relative to the second knife pair by an angle of 60° in the operating direction.

7. The residue chopper according to claim 1, wherein the counterknife comprises a serrated edge facing against the operating direction.

8. The residue chopper according to claim 1, wherein the fin is directly behind the counterknife relative to the operating direction.

9. The residue chopper according to claim 1, wherein the fin is offset along to the longitudinal direction relative to the counterknife.

10. The residue chopper according to claim 1, wherein the blunt side comprises a flat surface facing against the operating direction.

11. The residue chopper according to claim 1, wherein the blunt side comprises a ramped surface facing against the operating direction.

12. The residue chopper according to claim 1, wherein, when the counterknife support is in the third position, the fin does not extend into the cutting volume.

13. The residue chopper according to claim 1, wherein an effective length of the fin is equal to 5% to 50%, of an effective length of the counterknife.

14. The residue chopper according to claim 1, wherein an effective length of the fin is equal to 15% to 20% of an effective length of the counterknife.

15. The residue chopper according to claim 1, further comprising a plurality of additional counterknives and additional fins attached to the counterknife support at spaced locations along the longitudinal direction, each additional fin being located behind a respective additional counterknife relative to the operating direction, each additional counterknife and additional fin being movable in unison between respective first positions in which the additional counterknives extend a minimum predetermined distance into the cutting chamber and the additional fins are not within the cutting chamber, a second position in which the additional counterknives extend an intermediate predetermined distance into the cutting chamber and within the cutting volume and the additional fins are not within the cutting chamber, and a third position in which the additional counterknives extend a maximum predetermined distance into the cutting chamber and into the cutting volume and the additional fins extend into the cutting chamber.

16. The residue chopper according to claim 1, further comprising a shredbar extending into the cutting chamber and along the longitudinal direction and spanning the plurality of knives, wherein the shredbar does not extend into the cutting volume in any operating configuration of the residue chopper.

17. An agricultural combine comprising the residue chopper according to claim 1.

18. A residue chopper comprising:
a housing defining a partially enclosed cutting chamber;
a shaft rotatably mounted within the cutting chamber and configured to rotate in an operating direction about a rotation axis extending along a longitudinal direction;
a plurality of knives extending from the shaft at respective axial locations along the longitudinal direction, each of the plurality of knives extending from a respective proximal end at the shaft to a respective distal end at a radial distance from the shaft, the radial distance defining a cutting volume;
a counterknife support movably mounted relative to the housing outside the cutting chamber;
a counterknife mounted to the counterknife support to move directly with the counterknife support; and
a fin rigidly mounted to the counterknife support to move directly with the counterknife support, the fin being mounted behind the counterknife relative to the operating direction and having a blunt side facing against the operating direction;
wherein the counterknife support is movable between a first position in which the counterknife extends a minimum predetermined distance into the cutting chamber and the fin is not within the cutting chamber, a second position in which the counterknife extends an intermediate predetermined distance into the cutting chamber and within the cutting volume and the fin is not within the cutting chamber, and a third position in which the counterknife extends a maximum predetermined distance into the cutting chamber and into the cutting volume and the fin extends into the cutting chamber,
wherein the blunt side comprises a ramped surface facing against the operating direction, and
wherein the ramped surface extends from a proximal fin end adjacent to the counterknife support to a distal fin end spaced from the counterknife support, and the ramped surface at the distal fin end is behind the ramped surface at the proximal fin end relative to the operating direction.

19. The residue chopper according to claim 18, wherein the ramped surface comprises a concave surface facing against the operating direction.

\* \* \* \* \*